United States Patent Office 3,133,062
Patented May 12, 1964

3,133,062
PROCESS FOR PREPARATION OF s-TRIAZINE
Carol Louise Sloan, Yonkers, N.Y., and William Austin Barber, Springdale, Conn., assignors to American Cyanamid Company, New York, N.Y., a corporation of Maine
No Drawing. Filed May 2, 1961, Ser. No. 107,048
5 Claims. (Cl. 260—248)

This invention relates to s-triazine. More particularly, it relates to a process for preparing s-triazine from formamide.

Within recent years, the identification of the hitherto unreported symmetrical triazine has been definitely established principally because of the research of Grundmann and his co-workers. This compound, which was probably prepared as early as 1895 by Nef, has become of increasing importance in agricultural applications. In addition, s-triazine is the building block from which a large number of useful pharmaceutical products can be made. However, up until the time of Grundmann and Kreutzberger's work, only one fairly satisfactory method for the preparation of s-triazine was available. This method, that of Hinkel and Dunn, involved heating with a base a hydrogen cyanide hydrochloride having a composition lying between $(HCN)_2 \cdot 3HCl$ and $(HCN)_3 \cdot 3HCl$ which was formed from hydrogen cyanide and hydrogen chloride at low temperatures in an ether medium. While this particular method is quite satisfactory, it nevertheless suffers from several disadvantages. Thus, in addition to the necessity for the use of large quantities of hydrogen chloride to form the hydrogen cyanide hydrochloride which is later neutralized by equivalent large amounts of base, it will be evident that the multi-step process increases the overall cost of the preparation of s-triazine. Moreover, the intermediate hydrogen cyanide hydrochloride is unstable above ambient temperatures. An even more serious drawback, however, is found in the use of one of the reactants, i.e., hydrogen cyanide, from which the intermediate hydrogen cyanide hydrochloride is formed. Numerous safeguards must be employed during the process in order to prevent dangers arising from its use.

The Grundmann and Kreutzberger synthesis avoids many of the shortcomings of the Hinkel and Dunn procedure in that in it formamidine hydrochloride may be converted almost directly to s-triazine without the attendant hazard of handling hydrogen cyanide and without the need for resorting to a multi-step procedure. The Grundmann and Kreutzberger process, however, is disadvantageous in that the starting material, i.e., formamidine hydrochloride, must be first synthesized by means of costly and time consuming preparative procedures.

It is an object of the present invention to prepare s-triazine from readily available starting materials by a process which overcomes all of the disadvantages in the referred to prior art methods. Another object of the present invention is the affording of a process for the preparation of s-triazine in good yield in a simple and straightforward manner. A still further object of the present invention is providing a process for the preparation of s-triazine by means of a process which yields s-triazine in a pure form without the necessity of costly recovery and processing steps.

It has now been discovered that s-triazine may be prepared in good yield, in high purity, and in a simple manner by the dehydration of formamide. Unexpectedly, it has been found that s-triazine may be obtained by decomposing formamide at temperatures of from about 0° C. to about 200° C., and preferably at temperatures of from about 20° C. to about 150° C., by passing formamide in contact with suitable dehydrating agents and subsequently recovering s-triazine at temperatures at least above about 85° C. and below about 200° C., preferentially by sublimation from the reaction mass. That s-triazine could be obtained directly from formamide is indeed surprising and unexpected, particularly in view of the observation of Grundmann and Kreutzberger that dehydration of formamide led exclusively to the monomer, hydrocyanic acid. These workers further noted that a reaction analogous to the decomposition of thioformamide to yield s-triazine was not observed in the case of formamide because of its true amide form. Further, while prior art processes have disclosed the production of hydrogen cyanide from formamide at temperatures of from about 200° C. to about 800° C. together with ammonia, carbon dioxide, carbon monoxide and $HN(CONH_2)$ the formation of s-triazine has not been reported.

We have now found that certain dehydrating agents, more particularly, carbides and hydrides of alkali metals and carbides, hydrides and nitrides of alkaline earth metals are effective in promoting the dehydration of formamide to s-triazine. Illustratively, the carbides and hydrides of alkali metals such as lithium, sodium, potassium, and the like and the carbides, hydrides and nitrides of alkaline earth metals such as magnesium, calcium, strontium and barium, may be employed in the process of this invention. Of these dehydrating agents, the carbides, particularly calcium carbide, are generally preferred because of their availability. However, the nitrides and hydrides may be similarly employed with almost equally good results. The particle size of the carbides, hydrides and nitrides is not considered to be especially critical. However, for purposes of allowing the dehydration to proceed at a fairly rapid rate and to avoid the necessity of recycling unconverted formamide, particles of large surface area are preferentially employed.

The process of the present invention involves contacting formamide either in liquid or in vapor form with a suitable dehydrating agent or mixtures thereof at a temperature of from about 0° C. to about 200° C. The decomposition of formamide proceeds readily. In order to collect the product s-triazine, the temperature is maintained above about 85° C., and preferably above about 100° C. and below about 200° C. The product, s-triazine, sublimes from the reaction mixture and upon cooling of the vapors is deposited as a colorless crystalline solid. The product is identified by its melting point of 86° C., by its optical properties, and by infrared and mass spectroscopic analysis.

While atmospheric pressures are generally employed, subatmospheric pressures may also be used to advantage in the process. Dehydration of formamide may be accomplished in the presence of an inert and non-reactive gas such as nitrogen and the like which serves to convey s-triazine vapors from the reaction zone to a product collection zone.

The presence of certain anhydrous metal salts in amounts up to about 10% by weight of formamide is desirable, although not essential, in that such salts serve to increase the yield and to reduce undesirable side reactions. The theory as to why the presence of an anhydrous metal salt would promote the overall reaction is not completely understood. Consequently, we do not wish to be bound by any particular explanation as to its effectiveness in the process. Anhydrous metal salts of the iron group are particularly useful in markedly lowering the production of undesirable by-products. Metal halide salts of the elements of the iron group have been found to be particularly effective and are preferred. Thus, ferric chloride, cobalt chloride and nickel bromide, inter alia, have been successfully employed in the process of this invention. Although the halides of the metals of the iron group may be incorporated with the dehydrating agent with which formamide is contacted, it is preferred that the metal salts be admixed or dissolved in liquid formamide prior to its entry into the contacting zone.

In order to illustrate the present invention, but not in any limit it thereto, the following examples in which all parts are by weight unless otherwise indicated are given.

*Example 1*

A three-neck flask fitted with a gas inlet tube and addition buret is connected to a curved outlet packed with molecular sieve and receiver flask which is chilled in an ice-water bath. Finely ground calcium carbide amounting to 10 parts is placed within the flask and is maintained at 100° C. while 11.3 parts of liquid formamide containing 1.1 parts dissolved anhydrous $FeCl_3$ is added dropwise thereto. A dark brown residue forms and from such residue the product s-triazine sublimes and is collected in the receiver as colorless crystals. The reaction flask is subsequently heated to 133° C. in order to obtain fairly complete recovery of the product. A 20% yield of s-triazine is obtained and is identified by its melting point, infrared analysis and mass spectroscopic analysis.

*Example 2*

The pocedure of Example 1 is repeated except that 10 parts of calcium hydride are substituted for the calcium carbide employed in Example 1. Similar results are obtained.

*Example 3*

The procedure of Example 1 is repeated except that 7 parts of lithium carbide are employed in place of the calcium carbide used in Example 1. Similar results are obtained.

*Example 4*

The procedure of Example 1 is repeated except that 10 parts of calcium nitride are employed in place of the calcium carbide used in Example 1. Similar results are obtained.

*Example 5*

A vertical reaction tube packed with approximately 33 parts of coarse calcium carbide particles is heated by means of an electric furnace to 150° C. A nitrogen stream is passed up through the tube continuously while admitting 11.3 parts of formamide containing approximately 10% by weight of anhydrous ferric chloride dropwise to the top of the column. The product s-triazine is carried from the reaction zone by the nitrogen stream and is collected in a chilled receiver. A good yield of s-triazine is obtained by this procedure.

*Example 6*

Into a suitable reaction vessel containing therein 100 parts of formamide cooled to 0° C. is added 11.5 parts of powdered calcium carbide. A slow reaction ensues with evolution of acetylene. The mixture is slowly heated to 121° C. and the color of the reaction mixture is noticed to change from grey to yellow to green and finally to dark brown. As the temperature of the mixture is raised to about 100° C., s-triazine sublimes from the reaction mixture and is collected in a cooled receiver in a good yield.

While the present invention has been described in accordance with several preferred embodiments thereof, it is to be understood that various other modifications may be made within the purview of the present invention without departing from the spirit thereof. Consequently, the present invention is to be construed broadly and is to be limited solely by the appended claims.

We claim:

1. A process for the preparation of s-triazine which comprises contacting formamide with a dehydrating agent selected from the group consisting of carbides and hydrides of alkali metals and carbides, hydrides and nitrides of alkaline earth metals at a temperature between about 0° C. and about 200° C.

2. A process as in claim 1 in which s-triazine is recovered by sublimation from the reaction mixture by maintaining said mixture at a temperature greater than about 85° C.

3. A process as in claim 1 in which an anhydrous halide of a metal selected from the group consisting of metals of the iron group is present in addition to the dehydrating agent.

4. A process for the preparation of s-triazine which comprises contacting formamide with calcium carbide at a temperature between about 0° C. and 200° C. and recovering s-triazine.

5. A process for the preparation of s-triazine which comprises contacting formamide with calcium carbide in the presence of ferric chloride at a temperature between about 20° C. and 150° C. and recovering s-triazine.

References Cited in the file of this patent

UNITED STATES PATENTS

| | | |
|---|---|---|
| 2,042,451 | Bond et al. | June 2, 1936 |
| 2,429,262 | Fallows et al. | Oct. 21, 1947 |
| 2,529,546 | Fallows et al. | Nov. 14, 1950 |
| 2,781,348 | Schlittler et al. | Feb. 12, 1957 |

FOREIGN PATENTS

| | | |
|---|---|---|
| 762,194 | France | Jan. 18, 1934 |

OTHER REFERENCES

Schwab: Zeitschrift für Anorganische Chemi, vol. 262, pp. 41–48 (1950).

Hurd: "Chemistry of the Hydrides," pp. 28, 30, 32, 34–35, 42–44 and 166–167 (1952), John Wiley and Sons.

Grundmann et al.: J. Am. Chem. Soc., vol. 76, pp. 5646–5650 (1954) (note page 5649 in particular).

Newman et al.: Journ. of the Am. Chem. Soc., vol. 83, pp. 693–696 (February 5, 1960).

German Patentanmeldung R 13644 IVc/12p, Oct. 6, 1955.